(No Model.) 2 Sheets—Sheet 2.
G. A. BOBRICK.
AUTOMATIC SPECIFIC GRAVITY APPARATUS.
No. 324,808. Patented Aug. 25, 1885.

Witnesses.
S. N. Piper
E. B. Pratt

Inventor.
Gabriel A. Bobrick
by R. H. Eddy atty

UNITED STATES PATENT OFFICE.

GABRIEL ALEXANDER BOBRICK, OF BOSTON, ASSIGNOR, BY MESNE ASSIGNMENTS, TO HIMSELF AND FREDERICK N. WALES, OF NEWTON, MASS.

AUTOMATIC SPECIFIC-GRAVITY APPARATUS.

SPECIFICATION forming part of Letters Patent No. 324,808, dated August 25, 1885.

Application filed October 17, 1884. (No model.)

*To all whom it may concern:*

Be it known that I, GABRIEL ALEXANDER BOBRICK, a citizen of Russia, now residing in Boston, in the county of Suffolk, of the Commonwealth of Massachusetts, have invented a new and useful improvement in apparatus for automatically determining when a liquid in the process of its manufacture may have attained the necessary or desired specific gravity; and I do hereby declare the same to be described in the following specification and represented in the accompanying drawings, of which—

Figure 1:
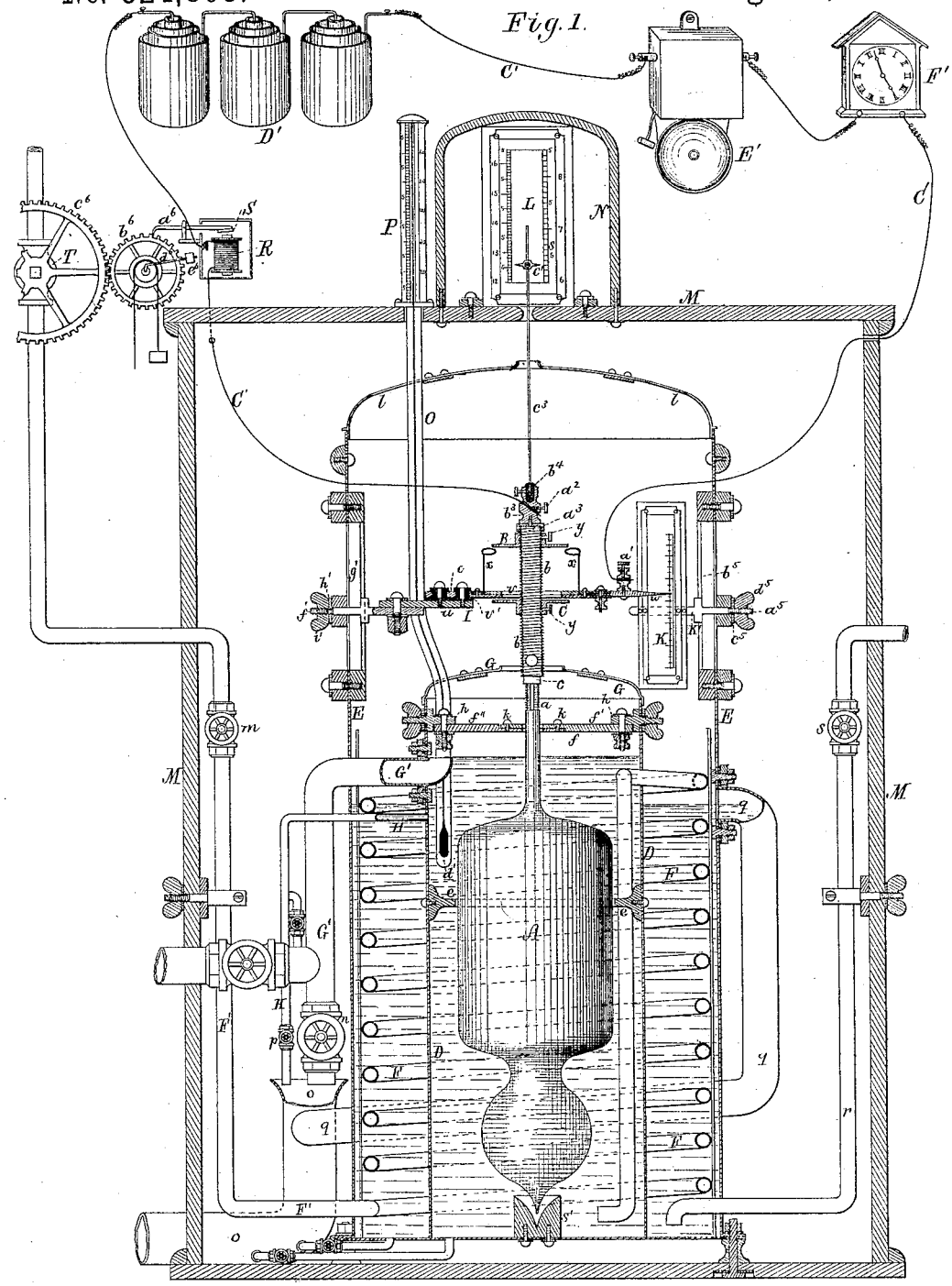
Figure 2:
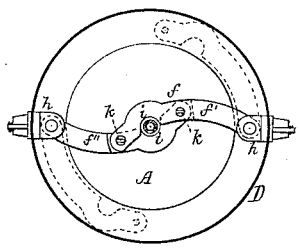
Figure 3:
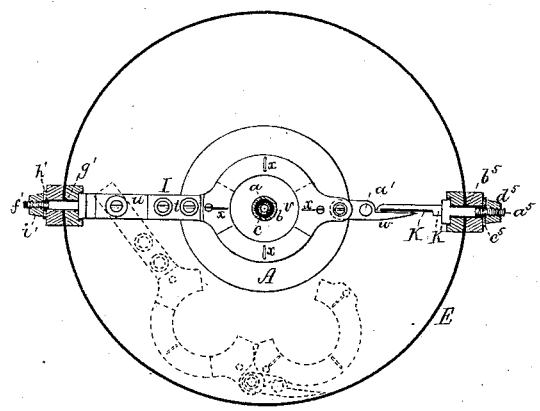
Figure 4:
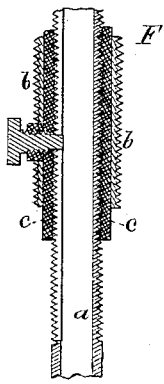

Figure 1 is a view of my improved apparatus, showing several of its parts in vertical section. Fig. 2 is a top view of the lower guide of the hydrometer-stem. Fig. 3 is a top view of the horizontally-movable arm arranged above the hydrometer-cistern. Fig. 4 is a section on an enlarged scale of a portion of the stem $a$ and its encompassing-tubes $b$ and $c$.

In some respects the apparatus hereinafter described is like that for which Letters Patent of the United States of America, No. 302,539, and dated July 29, 1884, have been granted to me, the principal features in common to the two being a hydrometer, a cistern or testing receptacle therefor, a spiral tubular coil or cistern or vessel holding such coil and the hydrometer-cistern, certain overflow pipes provided with valves or cocks, a waste-pipe, and a case to inclose the main parts of the apparatus. With such a collection of devices I have, in carrying out my present invention, combined others whose construction and uses are explained as follows, the nature of my invention being defined in the claims hereinafter presented.

In Fig. 1 of the drawings, A denotes a suitable hydrometer having its stem $a$ provided with two metallic collars or disks, B and C, adjustable vertically thereon by being screwed upon a screw-threaded tube, $b$, that encompasses a tube, $c$, of vulcanite or glass, which surrounds the stem concentrically and is screwed upon it. At its upper end the screw-threaded tube $b$ has fixed to it a metallic cap, $a^3$, surmounted by a circuit-wire clamp, $b^3$, from which a wire, $c^3$, projects upward to the scale, hereinafter mentioned as extended from the top of the case. The said threaded-tube insulator and its supporting-tube can be revolved on the screw of the main stem, so as to carry the wire nearer to or farther from the bulb of the hydrometer, as occasion may require.

The hydrometer is located within a covered cistern or receptacle, D, provided with suitable guides to the stem and body of the hydrometer to insure their proper rectilinear movements in the receptacle D, one of such guides being shown at $e$ and the other at $f$. The guide $e$ is an annulus surrounding the cylindrical part of the body of the hydrometer, and fastened to the encompassing inner surface of the said receptacle D. The guide $f$, however, is constructed so as to be capable of being moved aside for the purpose of allowing the hydrometer to be introduced into or withdrawn from its cistern D when the cover G thereof is off it. To this end the guide $f$ is composed of two arms, $f'$ and $f''$, each of which is pivoted to a bracket or support piece, $h$, and fixed to the cistern D, and projecting inwardly therefrom, as shown in Fig. 1, the same being so as to enable the arms to lap together at their inner ends when in line with each other, and to be movable laterally apart sufficiently to be out of the way of the hydrometer while it may be in the act of being introduced into or removed from the cistern. Each arm has in it a semicircular notch, $i$, which, when the arms are in engagement with each other and secured together by screws $k$ inserted in them, forms, with its fellow, a guide-passage to encompass the stem of the hydrometer.

The cistern or tank D is to hold the liquid to be tested, such cistern being placed concentrically within another cistern, E, of larger size and extending above the first one, and provided with a cover, $l$, as represented.

Between the two cisterns D and E and surrounding the inner one is a spiral coil, F, of pipe, which, open at its lower end, extends into the upper part and down nearly to the bottom of the inner cistern. The spiral coil at such lower end of it communicates by means of a pipe, F', having a stop-cock, $m$, with the source of supply of the liquid to be tested, and serves to convey such liquid into the coil, in passing through which it becomes cooled or sufficiently reduced in temperature.

Leading out of the inner cistern at a proper level is an overflow-pipe, G', which, provided with a stop-cock, $n$, opens at its lower end over an educt, $o$, leading to a drain or to a tank or suitable receiver of the liquid. Beside the said overflow-pipe there is to the hydrometer-cistern another and smaller pipe, H, that extends out of the cistern at a level somewhat below that of the pipe G', such pipe H being furnished with a stop-cock, $p$, and opening directly over the educt $o$. This pipe H is to reduce the level of the liquid in the hydrometer-cistern after such liquid may have ceased to flow into it. This reduction is to cause, immediately after the alarm has been sounded and the clock stopped, the upper disk to fall sufficiently down below the bends of the wires of the adjustable arm to break the circuit and stop the alarm. To the outer cistern there is also an overflow or eduction pipe, $q$, to regulate the height of water therein, such pipe being made at its lower end to open into the pipe $o$ when the latter may be leading to a drain or sewer. Furthermore, there is to the outer cistern an induction-pipe, $r$, for supplying it with water, such pipe being provided with a stop-cock, $s$, suitably arranged in it.

Between the two metallic disks B and C, and pivoted to the water-cistern, so as to be capable of being swung laterally out of range with the hydrometer, is an arm, I, made in two sections, $t$ and $u$, connected by screws and electrically insulated from one another by a mass of glass or vulcanite, $v'$, placed between them. Through the broader section $t$ is a circular aperture, $v$, for the passage through it of the screw-threaded tube carrying the two disks B and C, such aperture $v$ having a diameter less than that of the lower disk.

There is projected from the arm I a pointer, $w$, extended across a graduated scale, K, attached to a holder, K', arranged within and fastened to the upper part of the water-cistern. The scale K is stationary when its holder is so, but such holder has a screw, $a^5$, projecting from it through a vertical slot, $b^5$, in the outer tank, such screw being provided with a washer, $c^5$, and a thumb-nut, $d^5$, as shown, such devices admitting of vertical adjustment of the holder as the scale applied to it may require, as I sometimes use in the place of the scale, as represented, another of a different character.

Projecting upward from the arm I is a series of elastic metallic posts or wires, $x$, each of which, near its upper end, is bent inward in the form of a ring extended a short distance beneath the upper of the two disks B and C. These posts or wires $x$ are to be employed as an electrode in an electric circuit, as is also the portion of the arm to which they are attached. Each of the disks B and C has its hub provided with a set-screw, $y$, for clamping such disk to its screw after the disk may have been suitably adjusted in altitude thereon. Furthermore, the arm I is furnished with a coupling-screw, $a'$, for connecting to it one wire of the electric circuit, the other wire being attached to another coupling-screw, $a^2$, projecting from the upper of the disks B and C, or from some other suitable part of the apparatus.

To a wire or spindle, $c^3$, extending upward from the electric-wire coupling of the hydrometer-stem and electrically insulated from such coupling, as shown at $b^4$, there is fixed a pointer or indicator, $c'$, to move up and down with the hydrometer and against a specific-gravity scale, L, fixed to and projecting upward from the case M within which the apparatus is placed, the said scale being covered by a suitable hood, N, which, in front of the scale, may have an opening through which the scale may be seen, such opening being provided with a glass pane or a suitable door.

A thermometer, O, whose scale P extends above the top of the case M, has its bulb $d'$ within the hydrometer-cistern, and below the level at which the liquid to be tested is to stand therein.

In the electric circuit C' there may be employed, as represented in the drawings of my aforesaid patent, not only an alarm apparatus provided with a bell or gong but an electrical clock, such being to indicate when either of the disks B or C may be carried by the hydrometer against the metal between them, so as to close the circuit, an alarm being then given and the clock stopped. In this circuit there may also be an electro-magnet, R, having its armature S connected or applied by suitable mechanism to a valve or cut-off in the pipe, by which the liquid to be tested is conveyed to the hydrometer-tank, such being to shut off or intercept the supplying of the liquid to the hydrometer-tank on such liquid having attained the desired specific gravity. In Fig. 1 the circuit C', its battery D', alarm apparatus E', and clock F' are represented, they being such as are well known and in common use. The armature S is shown as fixed to a lever-pawl, $a^6$, that engages with a gear, $b^6$, which in turn meshes with another gear, $c^6$, fixed on the stem of the valve T. From the arbor of the gear $b^6$ an arm, $d^6$, extends and carries a weight, $e^6$, which, on the lever-pawl being drawn out of engagement with the gear will fall and cause the gear to revolve so as to revolve the gear $c^6$ sufficiently for it to close the valve. I do not confine my invention to such means of closing the valve, as others of a different and proper kind may be applied to it and the armature of the electro-magnet.

Assuming that the apparatus is connected with a boiler, tank, vat, or other apparatus in which a liquid is being made, compounded, or distilled, and that we desire to be notified when the said liquid may attain the desirable specific gravity, whether in accordance with the Baumé or Briggs or other proper scale, we proceed as follows: If the required specific gravity be above that of water or any other standard of the scale, we are to set the index or pointer of the projecting arm I at the mark on its scale indicative of the specific gravity, the said arm being applied to its supporting-cistern, so as to be adjustable vertically. To this end the part to which the arm is pivoted has a screw, $f'$, projecting from it into and through a slot, $g'$, formed vertically in the cistern, such screw being provided with a washer, $h'$, and a clamp-nut, $i'$. Next the lower of the two disks B and C is to be adjusted a certain distance from the arm, such distance being that between the zero and the specific-gravity mark of the scale. By natural laws any increase in the specific gravity of the liquid in which the hydrometer may float will cause the hydrometer to rise therein, and any decrease in the specific gravity of the liquid will have an opposite effect—viz., to cause the hydrometer to fall in the liquid. The hydrometer being evenly balanced and properly weighted its rise and fall will always be in a vertical line. On the liquid passing through, the hydrometer-cistern having attained the requisite specific gravity, the lower of the disks B and C will be moved up into contact with the arm I, whereby the circuit will be closed, the alarm apparatus set in action, the electric clock stopped, and the flow of liquid into the tank arrested.

The upper disk should be adjusted so that on the fall of the hydrometer to bring the disk into contact with the upright wires of the arm when the liquid has attained the requisite specific gravity less than that of the standard or water, the circuit shall be closed, in which case the alarm apparatus will be put in action, the clock stopped, and the liquid will cease to flow into the hydrometer-tank.

In the lower part of the hydrometer-tank is a rest or step, $s'$, for the lower portion of the hydrometer to enter and rest in in case of the hydrometer descending so far as to cause the upper disk to spring the wires below it aside and pass below their bends, the step being to prevent the upper disk from coming into contact with the arm I. The step limits the extent of descent of the hydrometer.

In an electrical hydrometer apparatus for the purpose described, I claim—

1. The combination of the adjustable arm I, in two sections or parts electrically insulated from each other, and its fixed scale K, with the hydrometer and either or both the disks B C, adapted to the latter, so as to be adjustable relatively to or longitudinally of its stem, substantially as set forth.

2. The combination of the adjustable arm in two sections electrically insulated from each other, with the electric wires extending upward from such arm, the fixed scale of such arm, and with the hydrometer and the two disks adapted to the latter, so as to be adjustable relatively to or longitudinally of its stem, substantially as set forth.

3. The combination of the screw-threaded tube and its tubular insulator encompassing the stem of the hydrometer with either or both the disks screwed upon such screw-threaded tube, and with the fixed scale and its adjustable arm made in two sections electrically insulated from each other and arranged with such disks, substantially as set forth.

4. The combination of the screw-threaded tube and its tubular insulator applied to the stem of the hydrometer with such hydrometer and with the fixed scale and its adjustable arm, the electric wires projecting upward from the said arm, and with the two disks adapted to screw upon such threaded tube, all being substantially as set forth.

5. The combination of the scale fixed to the top of the case with the hydrometer having to its stem a rod electrically insulated from its circuit-wire coupling and extending from the hydrometer upward to such scale and adjustable relatively to the stem lengthwise thereof.

6. The combination of the scale fixed to the top of the case with a rod electrically insulated from its circuit-wire coupling, and extending upward from the hydrometer, and provided with an indicator adjustable on such rod lengthwise thereof and arranged against the scale, all being substantially as represented.

7. The combination of an electric circuit with the hydrometer, the screw-threaded tube, its electrical insulator and adjustable disks, and with the fixed scale and the adjustable arm and its electric wires, such arm being in two sections electrically insulated from each other and adapted to the outer cistern, so as to be adjustable vertically relatively thereto, all being substantially as set forth.

8. The combination of the thermometer extending into the inner cistern and upward through the outer one and above the surrounding case, as described, with the two cisterns, the hydrometer arranged in the inner one, the circulating-coil disposed in the outer one, the adjustable arm and its fixed scale, and an electric circuit and electrodes applied to operate with such hydrometer, substantially as represented.

9. The hydrometer-guide $f$, consisting of the two arms $f'$ and $f^2$, pivoted to brackets $h$, fixed to the cistern D, and provided with semicircular notches $i$, arranged so that when the arms are together or lapped on one another such notches shall form a circular passage to guide the stem.

GABRIEL ALEXANDER BOBRICK.

Witnesses:
R. H. EDDY,
E. B. PRATT.